(12) United States Patent
Sansone et al.

(10) Patent No.: US 10,615,483 B2
(45) Date of Patent: Apr. 7, 2020

(54) COMPACT STABILIZED POINTING SYSTEM

(71) Applicant: STELLAR PROJECT S.R.L., Venezia Mestre (IT)

(72) Inventors: Francesco Sansone, Padua (IT); Alessandro Francesconi, Noventa Padovana (IT)

(73) Assignee: STELLAR PROJECT S.R.L., Venice Mestre (IT)

( * ) Notice: Subject to any disclaimer, the term of this patent is extended or adjusted under 35 U.S.C. 154(b) by 149 days.

(21) Appl. No.: 16/064,346

(22) PCT Filed: Dec. 16, 2016

(86) PCT No.: PCT/IB2016/057714
§ 371 (c)(1),
(2) Date: Jun. 20, 2018

(87) PCT Pub. No.: WO2017/115204
PCT Pub. Date: Jul. 6, 2017

(65) Prior Publication Data
US 2018/0375186 A1 Dec. 27, 2018

(30) Foreign Application Priority Data
Dec. 28, 2015 (IT) .......................... 102015000088006

(51) Int. Cl.
*H01Q 1/12* (2006.01)
*H01Q 3/08* (2006.01)
(Continued)

(52) U.S. Cl.
CPC .............. *H01Q 1/125* (2013.01); *H01Q 1/18* (2013.01); *H01Q 1/288* (2013.01); *B64G 1/1007* (2013.01);
(Continued)

(58) Field of Classification Search
CPC . B64G 1/1007; B64G 2700/24; F16F 13/005; F16F 15/022; H01Q 1/12;
(Continued)

(56) References Cited

U.S. PATENT DOCUMENTS

| 3,945,015 | A | * | 3/1976 | Gueguen | ................ | H01Q 1/125 |
| | | | | | | 343/765 |
| 4,598,297 | A | * | 7/1986 | Hawkins | ................ | H01Q 1/125 |
| | | | | | | 343/882 |

(Continued)

*Primary Examiner* — Tho G Phan
(74) *Attorney, Agent, or Firm* — R. Ruschena Patent Agent, LLC

(57) ABSTRACT

The preferred field of application of the present invention concerns the technology for the stabilization of the orientation of a pointing platform in small satellites as, for example, the so-called nano-satellites. In fact, the use of nano-satellites for low-cost space applications, requires that they have performances suitable to support a large number of possible new applications, in particular it is required that they can ensure adequate telecommunications capacity even with scarce power resources. Therefore, the availability of very precise pointing systems is essential in order to make communications as efficient as possible. Moreover, it should be noted that the nano-satellite platforms are also very unstable, and therefore such pointing, when acquired, must be continuously stabilized. Finally, the pointing and stabilization mechanisms must be light and compact in order to meet other typical constraints (weight and size, precisely) of space applications, but which may also be present in other areas of application. The mechanism specified in the present invention provides an adjustable support platform constrained to the satellite platform (or in general to an unstable platform) in one of its points by means of a joint with two or three degrees of freedom. The orientation and the stabilization of such orientable platform are then controlled by other constraints which consist in extensible legs with a controllable length. The mechanism, as a whole, provides a (Continued)

satisfactory solution to the problem of the stabilized pointing and allows, at the same time, to significantly reduce the weight and the overall dimensions.

7 Claims, 3 Drawing Sheets

(51) Int. Cl.
    *H01Q 1/18*     (2006.01)
    *H01Q 1/28*     (2006.01)
    *F16F 15/02*     (2006.01)
    *B64G 1/10*     (2006.01)
    *F16F 13/00*     (2006.01)

(52) U.S. Cl.
    CPC ........ *B64G 2700/24* (2013.01); *F16F 13/005* (2013.01); *F16F 15/022* (2013.01)

(58) Field of Classification Search
    CPC .......... H01Q 1/125; H01Q 1/42; H01Q 1/428; H01Q 3/02; H01Q 3/08; H01Q 15/16; H01Q 15/20
    See application file for complete search history.

(56) References Cited

U.S. PATENT DOCUMENTS

| | | | | | |
|---|---|---|---|---|---|
| 4,644,365 | A | * | 2/1987 | Horning | H01Q 1/125 248/183.2 |
| 4,783,662 | A | * | 11/1988 | Wirth, Jr. | H01Q 1/125 343/757 |
| 4,819,006 | A | * | 4/1989 | Whitesides | H01Q 1/125 248/278.1 |
| 5,061,945 | A | * | 10/1991 | Hull | H01Q 1/1235 343/840 |
| 5,526,010 | A | * | 6/1996 | Plunk | H01Q 1/1235 343/882 |
| 5,945,961 | A | * | 8/1999 | Price | H01Q 3/08 343/757 |
| 6,734,830 | B1 | * | 5/2004 | Bickham | H01Q 1/1221 248/910 |

* cited by examiner

COMPACT STABILIZED POINTING SYSTEM

BACKGROUND OF THE INVENTION

The preferred field of application of the present invention concerns the stabilization of the orientation of a pointing platform in small satellites as, for example, the so-called nano-satellites.

1. Field of the Invention

As it will be clear from the following description, the use of nano-satellites for low-cost space applications requires that these nano-satellites have sufficient performance to support new possible applications; for example, telecommunication capacity higher than that currently available could be required and, in this perspective, it could be particularly useful to provide these nano-satellites with a stabilized platform that allows the housing of a telecommunication terminal able to operate on optical band carriers, and such a terminal would require an accurate pointing in order to function.

2. Brief Description of the Prior Art

Although the need for a stabilized platform is very actual, and characterized by very demanding requirements, in the above cited space applications, it is clear that the technology presented in the following may also find application in other contexts in which there is the same need: i.e. the generic requirement of having a compact and lightweight platform capable of maintaining a stable orientation, with a given accuracy, even if it is mounted in a not stabilized support system.

The projects based on conventional satellites are characterized by a high cost for launches and very long times that would seem necessary to implement each mission. These prerogatives constitute a limit to the diffusion of traditional satellites and to their use for innovative applications with high business risk and, therefore, said prerogatives also represent a brake to the further developments, even under the technological aspect.

This technical-economic scenario, which penalizes the full development of commercial space applications based on traditional satellite platforms, on the other hand, seems to encourage the use of satellites of small or very small dimensions, such as the so-called nano-satellites. The latter, in fact, appear as a technological solution usable in many applications, and not affected by the limitations cited above.

It is clearer and clearer how the use of satellites weighing a few tens of kilograms or less is quickly establishing: conventionally, the name "nano-satellite" refers to any satellite that weighs less than ten kilograms, up to weigh only a few kilograms, and assumes dimensions on the order of a few decimeters.

So small dimensions and weights allow to drastically reduce the cost of their launch into orbit. This fact is very important as it triggers a virtuous economic loop: in fact, the higher expected number of launches justifies the consolidation of construction standards that allow the modular design of nano-satellite platforms, and the consequent further reduction of costs. Again, the large number of objects built according to appropriate standards will allow to achieve increased performance and reliability, encouraging more and more the establishment of nano-satellite technology in all the applications that allow its use.

Therefore, the description which follow will generally refer to the case of stabilization platforms mounted on nano-satellites; but this is not to exclude the case of larger satellites or even the installation in other environments in which there is the need of a platform capable of maintaining a stabilized pointing. The reference to the nano-satellites just represents a typical case of application that, in addition of being a case of application effective for the illustration of the present invention, also represents a very challenging application from a technical standpoint.

This brief overview about the expected success of the nano-satellite platforms is here mentioned mainly to underline the importance of a technical problem, which could have a major impact in terms of the acceleration of the applications based on nano-satellite technology.

In fact, the small size and weight, if on the one hand have the advantage of triggering the economic optimizations which were mentioned above, on the other hand pose new technical problems, since also the entire board instrumentation (or payload) must be designed to be particularly small, compact and lightweight, while contemporarily ensuring high performance even with the limited resources available.

In particular, it is important to take care of the performance of telecommunications systems. In fact, any satellite needs to communicate regardless of the application for which it is designed. For example, a satellite for observation, which takes images of the earth, must be able to transmit them towards a control center, as well as any other satellite, designed to collect meteorological or environmental data.

The problem of communications, in the case of nano-satellites, is also characterized by the fact that these satellites are placed in fairly low orbits and therefore they move with respect to the earth (and, in general, also between them) at fairly high speeds, therefore, the temporal windows of visibility, which are the periods of time during which the two terminals can communicate because sufficiently close and in view of one another, can be very short.

This constraint on communication timing, combined with the requirements on the amount of data to be transmitted that each application requires, pushes to seek communication systems capable of supporting considerable speed transmission. This is because, the higher the data rate that a nano-satellite can support, the greater the number of functions that it can perform, and less critical and complex will be the telecommunications network that will have to be prepared for each given application of such nano-satellites.

The radio transmission speed is in its turn linked to the transmitter power, and the power is related to the weight and size of the system. In summary, if the lightness and size requirements represent the essential constituent requirements for nano-satellites, it can be concluded that the radio communications that they can activate are limited in speed by weight constraints and dimensions of the transmitter (so limits on the power available).

This limitation in the radio communications has resulted in a growing interest for optical communications. The latter, in fact, allow to obtain the link-budget that, given the power available on board of the nano-satellite, can reach transmission speed of several orders of magnitude higher than the transmission speeds obtainable with transmitters in radio frequency. This is due to the higher directivity of the optical carriers and the better manageability of noise in the optical signals. Summarizing, it can be concluded that optical communications are particularly suited for constructing terminals capable of supporting considerable speed of transmission while maintaining reduced weights and dimensions.

It should be noted, in this regard, that the communication technology is not however the object of the present invention, because they are known optical transmission systems suitable to communication for applications on large satellites, or prototypes of such systems designed for operation on nano-satellites. Rather, the present invention focuses on the mechanical support of the telecommunication elements and indicates a platform to maintain the stabilized pointing, in order to benefit of the extreme directivity that can be reached with the transmissions on optical carriers.

For the purpose of the illustration of the present invention, the foregoing considerations only serve to indicate why it is important to be able to use optical terminals in communications involving at least one nano-satellite: and the reason is that communications on optical carriers (or laser-carriers) are particularly suitable for supporting high-speed and low-power communications.

The extreme directivity of a laser-carrier for optical communications, by contrast, at the typical distances of space applications, requires an extremely high pointing accuracy, of the order of micro-radians. Depending on the case, optical communications over great distances, and characterized by high capacity, may impose requirements on the pointing accuracy of the order of some micro-radians or few tens of micro-radians.

The sequence of the foregoing arguments, therefore, arrives to the identification of a very challenging technical problem.

In fact, the nano-satellites having a very low mass, are subject to solicitations in a wide spectrum of frequencies that determine movements difficult to compensate. Moreover, since for reasons of weight and dimensions, the quantities of on board resources (such as the propellant, the power or the inertial masses) are extremely reduced, the accurate stabilization of a whole nano-satellite is very complicated to be achieved.

Therefore, the pointing system needed to keep active a directional wireless connection, in particular when it is active on an optical carrier, must compensate for the inherent instability of orientation of the nano-satellite on which it is mounted.

The communication performances, involving a nano-satellite, which are up to now reachable by means of known systems, are still insufficient.

The objective is to provide a very compact terminal whose weight, including the pointing and stabilization mechanism, is of the order of a kilogram (or even lower) and that, at the same time, ensures a very high accuracy of pointing, even when installed on a particularly unstable platform such as a nano-satellite, which is very sensitive to environmental disturbances, as it is equipped with an attitude control system having much lower performances than those typical for traditional large satellites.

The critical nature of the mentioned technical problem is reflected in the fact that fully satisfactory solutions have not yet been proposed.

For example, in some projects coordinated by the MIT (Massachusetts Institute of Technology), where these problems are dealt with cutting-edge methodologies, a technical solution to the problem of stabilization of pointing is searched through the use of a technology called FSM (Fast Steering Mirror), which is a technology in which a laser source, fixed with respect to the nano-satellite platform, points towards a controllable orientation mirror capable of maintaining stable the orientation of the reflected beam.

Recourse to FSM technology allows to contain enough the weights and overall dimensions, since the laser emitter (fixed) can be mounted by means of small and light supports, the mirror is also a lightweight element, and the motors that control the degrees of freedom associated with the mirror, generally two degrees of freedom, can be pushed up to a significant miniaturization. The limit of FSM technology is in the small range of pointing, typically less than some tenths of a degree. Especially for high frequencies, the very fast actuators have short strokes, and this range limitation involves at least two very significant contraindications. The first consists in the fact that the FSM technology cannot perform the pointing function, but just stabilization: and therefore the overall system must be composed of a pointing mechanism, even with insufficient precision, coupled to the stabilization system in the FSM technology. The second drawback is that the limited range needs to be also compensated with a wide divergence of optical carriers, which penalizes the gain and, consequently, reduces the transmission capacity. In fact, the implementations currently available suffer from the limitations mentioned above, which are quite critical with respect to many applications of interest, as they have impact on both the compactness of the system and on its reduced suitability to support high bit-rate communications.

Other projects, such as the project SOTA (Small Optical Transponder), promoted by the "Japanese National Institute of Information and Communication Technologies" base their developments by recurring to optical transmitters directly mounted on mechanisms with controllable joints that allow to control at least two degrees of freedom. This project, however, provides for the mounting of the telecommunications system on a platform of size and mass that does not allow the integration on board of a nano-satellite; therefore, the mass and power constraints are less stringent, and also the pointing requirements are less demanding, because a larger satellite is also inherently more stable. All this has led to the development of solutions with features that cannot be scaled towards nano-satellites, with the total weight of optical terminals (including the pointing mechanisms) of the order of some kilograms.

SUMMARY OF THE INVENTION

Therefore, the main scope of the present invention is to devise a new mechanism capable of ensuring a very stable pointing, having very high precision even when mounted in a support (such as, for example, a nano-satellite) subject to significant movements and vibrations over a wide spectrum of frequencies.

Another scope of the present invention is to conceive a new stabilization mechanism lighter and more compact than the known ones and, possibly, economic (also in terms of reliability and operation).

Finally, further scope of the present invention is to conceive a new stabilized pointing mechanism that may represent a module, potentially standardized, suitable to be coupled to a small satellite (e.g. a nano-satellite) able to operate in space environment.

The intended purposes for this invention are achieved by a stabilized pointing system comprising a movable supporting element bound with at least three coupling elements to an unstable platform, wherein said coupling elements are characterized in that:

1. one coupling element is a joint, which allows rotation only with two or three degrees of freedom, and which connects together said movable supporting element and said unstable platform;

2. the other at least two coupling elements are extensible legs, whose length is variable, and each of said extensible legs is bound to said movable supporting element at one of its end, and to said unstable platform at the other end part;

3. the bonds of said at least two extensible legs with said movable supporting element and with said unstable platform are joints, which allow rotation only, with at least two degrees of freedom each;

4. in the case in which both the bonds at the two end parts of an extensible leg allows only two degrees of freedom, one part of such extensible leg is allowed to rotate with respect to the other part around the extension axes (therefore, the leg incorporates an internal joint allowing the torsion);

5. each extensible leg includes an actuator element, which allows the control of its length.

6. at least one of said extensible legs (in the preferred embodiments, each of said legs) also comprises one element for damping and attenuation of the extension or compression of said extensible leg.

BRIEF DESCRIPTION OF THE DRAWINGS

The main advantage of the present invention is given by the fact that a stabilized pointing system of a mobile platform realized according to the teachings of the present invention, fulfills the main purposes for which it was conceived. This invention also has further advantages that will be made apparent from the following description, which shows more details, from the attached claims, which form an integral part of the same description, and from the illustration of some examples of embodiment described, but not limited to, in what follows, and in the accompanying drawings in which:

DETAILED DESCRIPTION OF THE PREFERRED EMBODIMENTS

Figure 1:
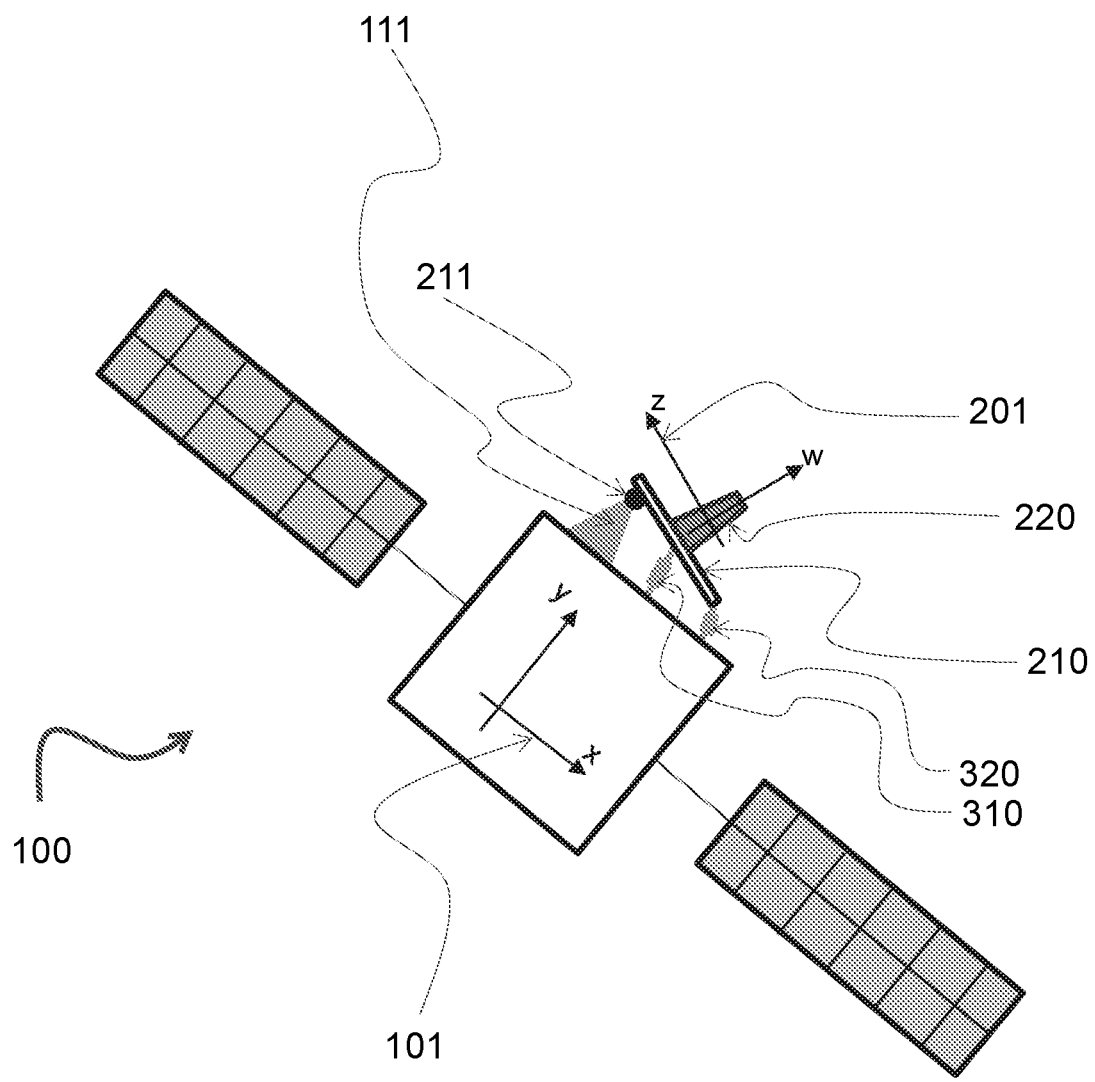
FIG. 1 shows a satellite equipped with stabilized pointing system according to the teachings of the present invention.

FIG. 1 provides an overall view of a nano-satellite in which it is highlighted the presence of an optical transmitter for telecommunications mounted on an adjustable support stabilized according to the invention.

The number 100 indicates the nano-satellite platform exclusive of any payload. With the number 101 is indicated a Cartesian reference system integral with said nano-satellite platform 100.

The reference system 101 follows the movements of the nano-satellite platform 100 and thus it moves both with respect to the earth and with respect to other satellites. As already said, with regard to nano-satellite platforms, such movements of said reference system 101 are both translational and rotational, and they are characterized by significant amplitudes in a wide spectrum of frequencies. These characteristics of the movement of the reference system 101 are structurally ascribed to the technology of nano-satellite platforms and is not expected, in the short time, any technology for the stabilization of the entire nano-satellite platform, able to eliminate some components of such motions without reduce or affect the resources available for the payload of the nano-satellite.

In fact, the elimination, or even just a significant limitation, for example of the rotations, would require stabilization systems with significant impact on the restrictions of weight and cost; while the research on the nano-satellite platforms, at this time, prioritizes, sometimes also exasperates, the reduction in weight and cost.

The present invention, therefore, is aligned with this evolution trend in nano-satellite platforms (and small satellites in general), and proposes a solution to the problem of the stabilized pointing that has a minimal impact on these satellite platforms, as they are fast evolving.

This solution therefore has significant modularity, in the sense that it maintains a minimal impact on the development requirements and on the evolution of the platforms on which it will be applied. Therefore, it is a solution that aims to be indicated to be a possible standard in the industry.

Still in FIG. 1, the number 111 it indicates a constraint element integral with the reference system 101 that provides a constraint point on which to attach a mobile and orientable support. Said movable supporting element is indicated in FIG. 1 by the number 210, while the number 211 indicates the constraint of said movable supporting element 210 with said constraint element 111, and thus with the nano-satellitare platform 100; and said constraint 211 is constituted by a free joint which allows, depending on the embodiment, two or three rotational degrees of freedom.

It is noted at this point that, to determine the orientation (or the pointing) of the supporting element 210, two rotational degrees of freedom would be theoretically sufficient; however, the pointing and stabilization mechanism which will be described below makes use, preferentially, of movements which provide that said constraint 211 is a rotational joint with three degrees of freedom. In fact, the third rotational degree of freedom can be useful to accomplish the movements of the pointing system with more convenient trajectories, which allow to satisfy additional optimization conditions, such as the minimization of power consumption or the increased speed of actuation, etc.

Said constraint element 111, fixed with respect to the reference system 101 of the nano-satellite platform 100, may be constituted by a sort of bracket applied to a nano-satellite platform according to one of the available standards or, in any case, it can be constituted by any appropriate element of an existing nano-satellite platform, for example an edge, which allows to attach the movable supporting element 210 in a position that allows an adequate margin for the movement of rotation in all directions, so allowing a sufficient pointing amplitude.

In a variant embodiment, said constraint element 111 may also be, in part or entirely, an intermediate platform, movable with respect to the reference system 101, integral with the satellite platform 100, but anyway still unstable, with respect to the requirements of the pointing system.

As already said, in the case where there are no intermediate platforms (the case with intermediate platforms will be described later), said movable supporting element 210 is bound to the nano-satellite platform 100 by means of the joint shown in FIG. 1 with the number 211 (placed on the constraint element 111) which only allows movements of rotation with two or three degrees of freedom. The number 201 then indicates a Cartesian reference system integral to said movable supporting element 210. For the effect of the constraint type with which said movable supporting element 210 is bound to the nano-satellite platform 100, the reference system 201 can rotate with respect to the system 101 integral to the nano-satellite platform 100. In particular, said movable supporting element 210 can be controlled so as to maintain a particular pointing indicated, in FIG. 1, by the axis "w" of the reference system 201.

Still in FIG. 1, the number 220 indicates the example of an optical antenna of a laser transmitter, suitable for transmitting a telecommunications signal modulated over an optical carrier. Said laser transmitter 220 is mounted on said movable supporting element 210 and it is integral with it. In the case represented in FIG. 1, the reference system 201, integral to the movable supporting element 210, has been chosen so that the "w" axis also coincides with the direction of pointing of the laser transmitter 220. Obviously, the mounting mechanisms of the laser transmitter 220 on the movable supporting element 210 may be of various types: what matters for the purposes of implementation of the present invention is the fact that the laser transmitter 220 is mounted on a supporting element 210, movable with respect to the nano-satellite platform 100 (which is an inherently unstable platform), and, by the control of said movable supporting element 210, it is possible both the control and the stabilization of the pointing of said laser transmitter 220.

The use of the two distinct expressions: "stabilization" and "control" of the pointing, it is essential in order to clarify that the mechanism described is also suitable to support the pointing functionality itself, being able to operate over rotation amplitudes, which can easily reach the order of ten degrees.

Other known methods, which are able to compensate for the instability of a platform, do not allow the "range" of movement sufficient to control the real pointing, and therefore they must be coupled to other systems that can ensure a pointing which must then be stabilized with a finer control.

It is important to notice that the control of the pointing of said supporting element 210 does not happen by the direct application of torques on the joint 211 (which would lead to maneuver the movable supporting element 210 by resorting to disadvantageous levers): This last joint, in fact, is designed to be extremely simple from the constructive point of view, and is constituted by a pure rotary constraint. The articulated joint 211, therefore, in a preferred embodiment, is a very simple mechanism with no gears or mechanisms for the transmission of the motion and may be constituted, for example, by a coupling of rotating bearings, therefore characterized by high reliability.

The orientation of the movable supporting element 210, with respect to the nano-satellite unstable platform on which it is mounted, is then determined by actuators constituted by at least two extensible legs.

The number 310 shows one of the legs by which said movable supporting element 210 is bound to said nano-satellite platform 100, while the number 320 shows a second extensible leg, similar to the leg 310, but not necessarily identical. Said extensible leg 310 is bound in its two ends by means of rotating constraints: on one end it is connected to said movable supporting element 210, and on the other end it is connected to the nano-satellite platform 100. It is important to note that even in the joints which bind the leg 310 it is not provided, as in the case of the joint 211 (by which the movable supporting element 210 is connected to the nano-satellite platform 100), the direct application of any torque. The only active elements are located in the extension mechanisms of the legs.

The orientation of the movable supporting element 210 is therefore determined by the length assumed by the extensible legs, with which said movable supporting element 210 is connected to the said nano-satellite platform 100.

The joint 211 and the connections via extensible legs are the only constraints by which said movable supporting element 210 is connected to the nano-satellite platform 100, from which suffers the stresses that make it unstable, so as to make particularly difficult a precise pointing.

Finally, it should be pointed out that all the various extensible legs, in the preferred implementation, have the same characteristics (de facto they are all equal).

However, in theory, they can also be of different shape and size, and may have some different mechanical characteristics. In any case, such legs, as the leg 310, are all characterized by being connected at their ends, by means of rotating constraints, on one end to the movable supporting element 210, and on the other end to the nano-satellite platform 100. Furthermore, all the extendable legs are, precisely, extensible in a controlled manner as they include a linear actuator. It is noted that with the expression "linear actuator", is intended to refer to any type of actuator, possibly comprising also the mechanisms for the transformation of the rotational motion, which allow to vary the length of an extensible leg in a controlled way. And the length assumed by these extendable legs determines the orientation of said movable supporting element 210 with respect to the nano-satellite platform 100.

Figure 2:
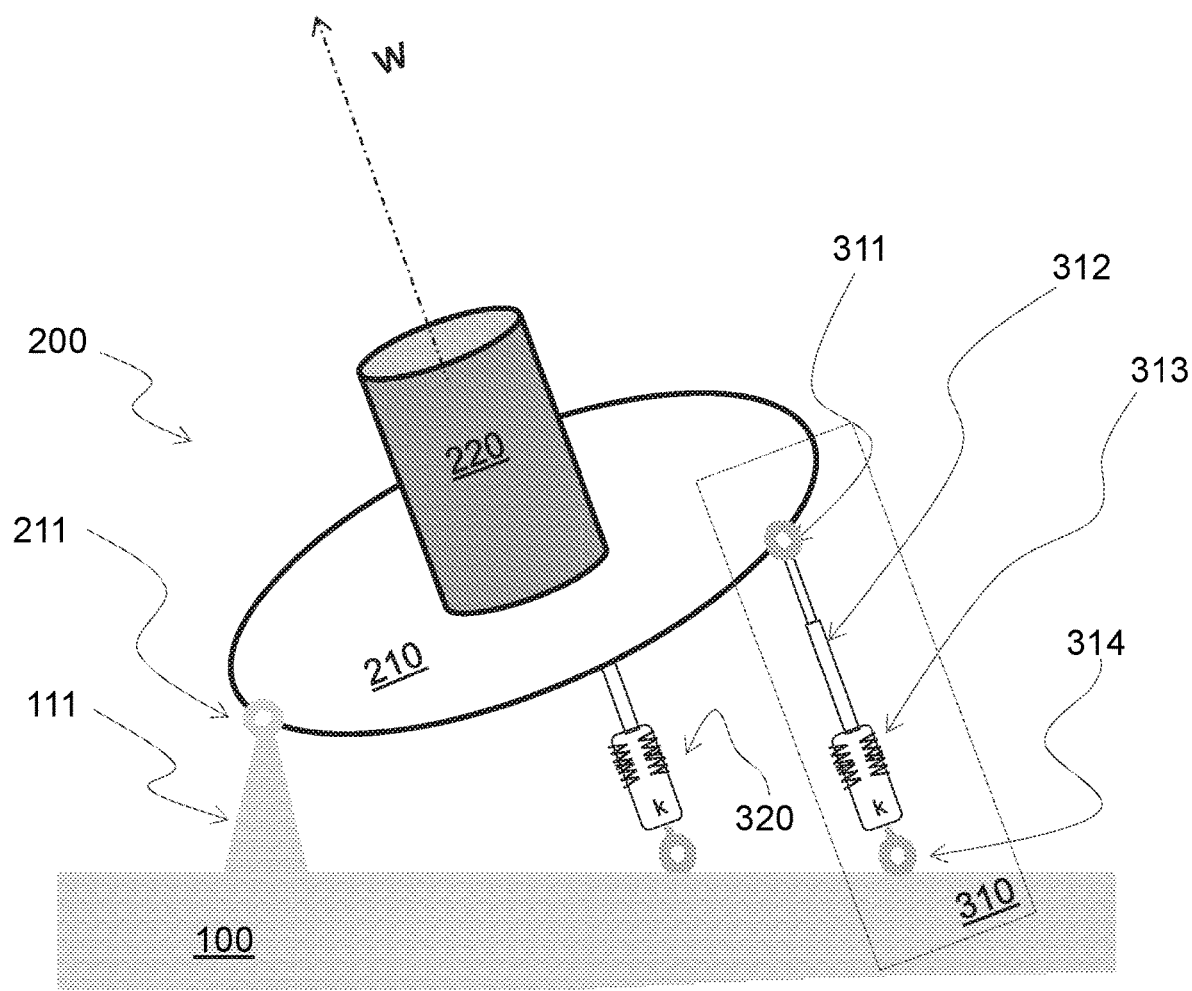
FIG. 2 shows, more in detail, the characterizing elements of the stabilized pointing system according to the teachings of the present invention.

FIG. 2 reproduces an example of implementation similar to that of FIG. 1 (which well illustrates the inventive principles of the present invention), and therefore also in FIG. 2 some elements of the system for the stabilization of the pointing of the movable supporting element 210, according to the teachings of the present invention, are indicated by the same numbers used in FIG. 1. Therefore, the number 100 indicates the nano-satellite platform (in FIG. 2 just partially visible), the number 210 still represents the movable supporting element and the number 220 shows the optic antenna of the laser transmitter. As in FIG. 1, the pointing direction of the optical antenna of the laser transmitter 220 is the direction of the axis "w" of the Cartesian reference system 201 integral with the movable supporting element 210.

The number 200 then indicates in general the whole mobile system, which consists in the set of all the elements which are integral with the movable supporting element 210.

FIG. 2 also shows two extensible legs that, in function of their variable lengths, determine the orientation of the mobile system 200. Said two extensible legs are indicated with the numbers 310 and 320. In the leg indicated with the number 310, which is located in the foreground and confined within a dashed rectangle, some characterizing elements that compose it are shown in more detail. The number 311 represents one free joint that allows the extensible leg 310 to be connected to the movable supporting element 210. The number 314 represents another joint with at least two degrees of freedom that allows the extensible leg 310 to be connected, at the other end, to the nano-satellite platform 100.

In the example of implementation of FIG. 2, only the ball joint 311 is a free bond with three rotary degrees of freedom, while the other constraint is realized with a simpler joint with two degrees of freedom, however, the implementation choice could be reversed, and provide that it is the joint 314 to be free to rotate with three degrees of freedom. Given that in a system with two extendable legs a configuration in which all the joints are free (three degrees of freedom) is possible, it is theoretically also possible a further variant which instead allows only the use of joints with just two degrees of freedom, at both the ends of each extensible leg: in this case, a torsional stress on the extensible leg would be generated; however, the phenomenon could be easily accommodated by providing the presence of a joint that allows a free torsion in an intermediate point of an extensible leg.

However, among the aforementioned implementation variants, the preferred ones are those in which one rotating constraint, at one end of the extensible leg 310, is a free joint, while the other rotary constraint, at the other end of the extensible leg 310, is an articulated joint with to two degrees of freedom.

Returning to the examination of the extensible leg 310 (as also in the other extensible legs) it is noted that it comprises at least two extending elements placed in series, so that when both extend, the overall extension of the leg 310 is given by the sum of the extensions of the two elements; when instead both are compressed, the total compression of the leg 310 is given by the sum of the compressions of the two elements (obviously when an element is compressed and the other extends, the two effects compensate at least partially in the leg length variation).

The number 313 shows an attenuation and damping element, which is a compression or extension passive element. Said passive element 313, in a typical implementation, is characterized by a rigidity "k" and by a dissipative coefficient "c" and, in fact, it acts as a spring (usually non-linear, and also characterized by dissipative properties) acting as a low-pass filter (of the second order, at least, since it is also characterized, as said, by a coefficient of dissipative friction).

The number 312 instead represents a linear actuator which allows the lengthening and/or shortening of the leg. It is, in this case, the active and controllable element, which allows to change the length of the leg 310 within a certain range.

It has to be noted that: the more the passive damper 313 behaves as an ideal low pass filter, with low cut-off frequency, and the more the movable supporting element 210 would result in a stabilized orientation, at least when solicited by frequencies well above the cutoff frequency. In fact, all the high-frequency solicitations, determined by the movements of the nano-satellite platform 100, and transmitted through the bond 314, would be absorbed by said passive damping element 313, that at its other extreme would present itself almost stationary, and would transfer to the active linear actuator 312 just low frequency movements. It is clear, however, that the ideal behaviors are just theoretical approximations, not replicated in real systems and, above all, the control of the length of the leg requires that the control movements also transmit components at sufficiently high frequencies (e.g. to perform fast pointing controls). Therefore, said passive attenuation and damping element 313 absorbs only a portion of the stresses produced on each extendable leg by the nano-satellite platform 100 to which it is connected, and will transfer the rest of these stresses to its other end. The linear actuator 312 is therefore necessary, since it has to compensate any stresses not filtered by the passive damper 313 (and particularly the lower frequencies for which the damper is not designed).

It is now clear how the presence of a passive element 313, in each leg of the stabilization system according to the invention, allows to facilitate the stabilization control of the movable supporting element 210, by filtering a relevant part of the motions which would have been to be compensated.

It should be also clear now that the more the passive damper 313 is able to filter, absorbing them, the stresses induced by the nano-satellite platform 100, the more will result simplified the task of stabilizing which is on charge of the active linear actuator 312.

In a typical embodiment of the present invention, the passive attenuation and damping element 313 comprises a spring characterized by very low stiffness. Note, in this regard, that in low gravity environments (as the space environment is) it is certainly possible to use very "loose" springs (since there is no need to compensate the weight that may compress or extend excessively these too "loose" springs). However, studies are ongoing to devise passive dampers more complex than simple springs, and the results of such studies can generate other types of dampers 313 with increasingly efficient performance in relation to the application indicated by the teachings described in this patent.

In general, in the real cases, where the construction of the extensible legs is based on the use of springs or pistons or other real physical components, the characterization may be formalized by a simplified model in which a purely elastic element (characterized by a coefficient of elasticity "1/k") and a dissipative element (characterized by a coefficient "c") are placed in series. Or they can be deployed according to a more complex model, where some elastic and dissipative contributions are combined in different ways, both in series and in parallel.

The teachings of the present invention, therefore, allow to realize a movable supporting element 210, controllable in its orientation by means of a few (typically two) linear actuators, and the achievable overall stabilized system is very compact and maintains somewhat a low weight.

The stabilization control that can be implemented reaches very satisfactory performances of precision and speed of response thanks to the particular system of constraints and to the insertion of some passive attenuation and damping elements that make much simpler the design of an automatic control function with which controlling the linear actuators which are, precisely, the control elements. In other words, the system of constraints indicated in the present invention is suitable to support the execution of a control function designed to generate control commands for the linear actuators, able to achieve very small tolerance errors, and also in line with the particularly stringent requirements posed by the pointing applications for optical communications involving nano-satellite platforms.

The choice of a passive element of attenuation and damping, characterized by a certain rigidity "k" and a certain dissipative factor "c", not subject to active control, is dictated by considerations of simplicity, and for this reason it can be considered a choice for the preferred embodiment. However, the principle of the present invention resides in the concept of maneuvering the orientation of the moving platform 210 by controlling the length of two or more extensible legs that, in addition to the actuator element, also include an element for attenuation and damping, suitable to filter some mechanical solicitations. Therefore, such inventive principle can also be implemented according to a variant that, while introducing greater complexity, provides an element for attenuation and damping which can also be active: for example, an element in which the control of the coefficient "k" is permitted, or a mechanical filter of greater complexity and order, in which a plurality of coefficients can be controlled.

Therefore, all variant embodiments that make use of elements of attenuation and damping of different complexity and order, and eventually even not passive (in the sense that a certain control of one or more of coefficients of elasticity or dissipative damping is allowed), are all to be considered variants of the same invention.

As stated above, the number of extensible legs with which it is possible to realize the present invention is variable and, although the case with just two legs is to be considered preferred one, because it is the one that is simpler and more compact, also the cases with three legs are to be considered realistic implementations of the present invention, as well as the cases with a greater number of legs.

From a functional standpoint, the presence of three extensible legs offers the opportunity to have three control parameters, and thus theoretically allows to control three degrees of freedom.

It is clear that the pointing (and stabilization) applications normally require the control of just two degrees of freedom, it is not generally required a mechanical control of the polarization of optical signals; however, in some cases, there may also be a reason to opt for functional implementations with three legs: for example, three legs imply a system of constraints that allows to manage the robustness requirements with greater flexibility. The control of the third degree of freedom also enables to fulfill movements with a greater number of possible trajectories, among which can be selected the one that minimizes, for example, the extension of the legs, or the extension speed, or the power consumption.

As already mentioned, the system shown in the present invention can support pointings with amplitudes of the order of ten degrees: it is a "range" already sufficient for many applications, but in some cases of application it may be important to increase, even of a few degrees, this "range", in order to meet further potential application requirements.

In many cases, especially in satellite platforms that must also support other applications, may be required amplitude of pointing greater than that permitted by the mobility of the mobile system 200 and, when it was not possible to compensate the reduced pointing amplitude by resorting to a variation of the entire satellite orientation, it is necessary to increase the width of the pointing "range" with recourse to alternative measures.

Obviously, using more bulky stabilization systems, with longer legs and with a more protruding constraint element 111, the amplitude of the pointing "range" may be increased: however, it is better not to follow this path, not only because it increases the overall dimension (this consequence it is substantially inevitable), but also because it complicates the modularity of the system and makes it less standardizable, since different modules should be provided, depending on the required pointing "range". Moreover, the choice of the actuators would be more difficult, since, in general, the increase in the operating "range" implies a reduction of the response speed.

There is then another solution, which can be seen as a mounting variant of the system according to the teachings of the present invention, and which provides that this system is not bound directly on the satellite platform 100 or, in any case, on an element rigidly connected to it, but provides that it is bound to an intermediate platform which, in turn, can move with respect to the reference system 101 integral with the satellite platform 100.

Figure 3:
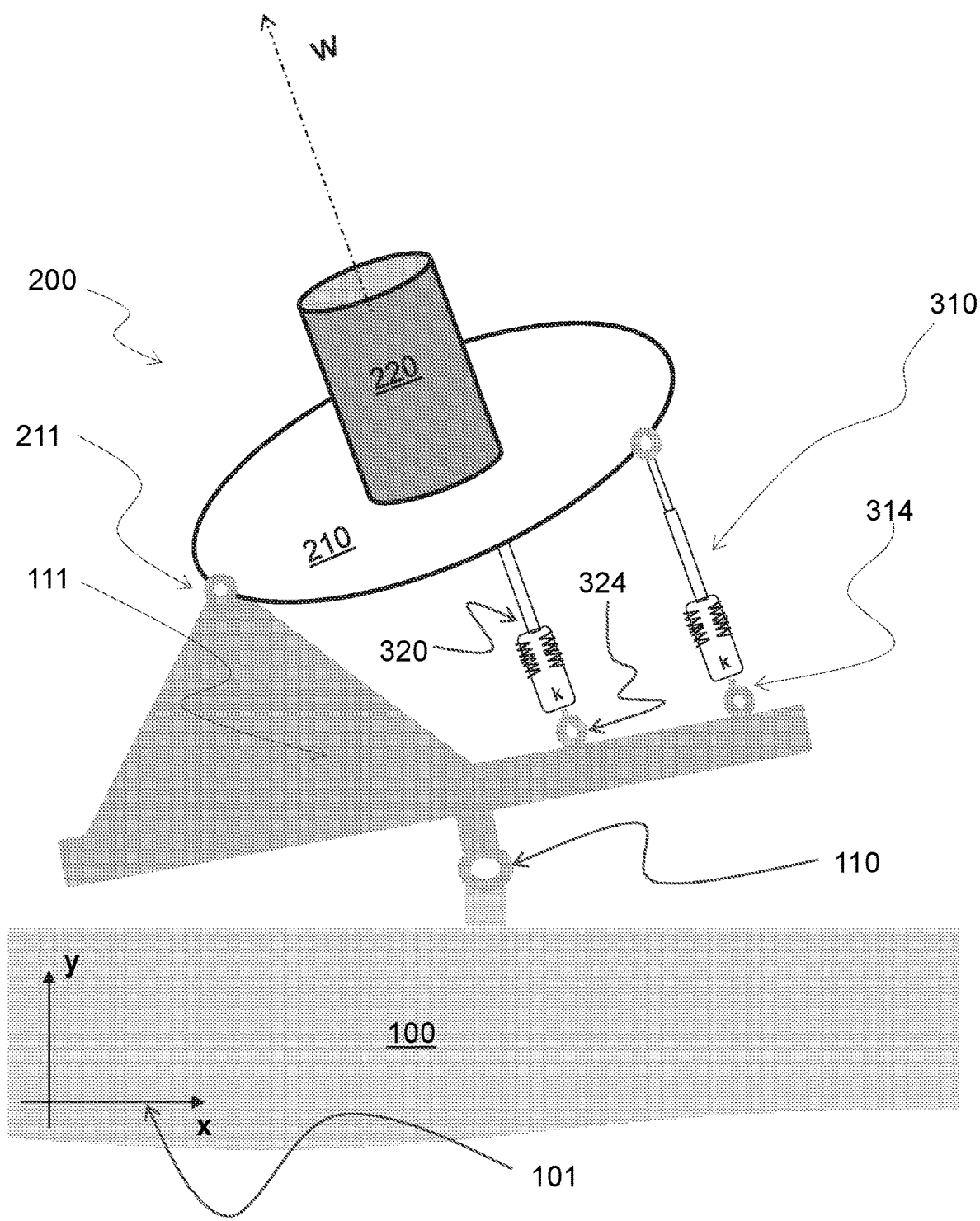
FIG. 3 shows a special case of mounting of the overall stabilized pointing system.

FIG. 3 shows such a further mounting variant of the stabilization and pointing system according to the invention.

In the upper part of the figure it is represented the movable supporting element 210, stabilized as in the example shown in FIG. 2. In FIG. 3, however, the constraint element 111 is not integral with the nano-satellite platform 100, but it can move with respect to it, and then with respect to the reference system 101. In FIG. 3, the constraint element 111 then assumes a more extended form, as it offers the coupling points even for the extensible legs, which in the case of FIG. 2 are instead bound to the nano-satellite platform 100.

Therefore, in FIG. 3, (unlike in FIG. 2) the rotary joint which bind the leg 310 to the constraint element 111 (which in this case becomes an intermediate platform) is indicated with the number 314 and similarly the number 324 indicates the rotary joint which bind the other extensible leg, always to the same constraint element 111.

Finally, the number 110 shows a further rotary joint with which said constraint element 111 is connected to the satellite platform 100 (which, therefore, is not rigidly attached to the latter). The rotary joint 110 is controllable by a generic actuator mean; the control of said joint 110, however, is not thought to accurately compensate the instability of the nano-satellite platform 100, and therefore the constraint element 111 will continue to be an unstable intermediate platform, and the movable supporting element 210 will continue to need, also in the configuration shown in FIG. 3, a control for the stabilization and for the pointing, as happens in the case represented in FIG. 2.

The main function of the rotary joint 110 is therefore that of increasing the pointing amplitude.

It is immediate to appreciate how, in the configuration of FIG. 3, the same mechanical module designed to be the movable supporting element 210, stabilized and adjustable in a controlled manner, can be used in systems where a higher pointing amplitude is required; and everything can be adapted only by adding a further controlled joint.

It is important to point out that the actuator means which implement the control of said joint 110 are not required to have specific performances. In theory, then, is not even a requirement that the constraint element 111 is bound by means of a rotating constraint 110, or only by means of a rotating constraint 110; in fact, the function of increasing the "range" of the angular pointing can be achieved with any type of bond that allows the constraint element 111 to perform certain movements of rotation with two degrees of freedom with respect to the reference system 101 integral with the satellite platform 100.

The invention just described can also lend itself to numerous variants that may offer additional advantages compared to those previously mentioned. And these further variants can be developed by the man skilled in the art without departing from the invention as it is clear from the present description and the claims appended hereto.

Therefore, the position of some described elements can be changed, for example the order in which the active and passive elements are positioned in the extendable legs can be reversed.

The accuracy and efficiency of the control of the orientation of the system 200 can then be improved by means of an optimization of geometric type, for example by changing the inclination of the extensible legs. These geometric optimization processes are also functional to make the overall system more compact and more solid, and the solutions which will be reached must be all considered variants of the same inventive principles taught in the present invention.

In addition, each element can be developed in different materials, size or shape; as well as the invention itself can be realized in a partial way and many described details can be replaced by technically equivalent elements.

Finally, the described invention lends itself to incorporate and to support additional techniques to further improve the performance of the described stabilized platform. In particular, a significant progress is expected in achieving the passive element 313 coupled to the extendible legs. Furthermore, also the linear actuators 312 are susceptible to technological progress: lighter, more accurate or faster controllable linear actuators may be soon available, and therefore they could be used to implement new and more effective measures for the stabilization control.

Especially interesting could be an implementation in which the parameters of dissipation and rigidity/elasticity are obtained in the structure of the motor itself. The real engines, of course, always include these parameters, since do not exist absolutely non-deformable materials and motions not affected by friction, however, there are not sufficiently mature technologies that allow the design of engines in which the determination of these parameters can be adequately set with the necessary freedom as a design variable. However, in the eventual case in which there were available techniques of design and materials that allow to develop motors in which such coefficients of rigidity and of dissipation are controllable, as happens for the other parameters of performance, the present invention may obviously be implemented through extensible legs in which all the components are integrated in a single element.

It is clear that many improvements may then be conceived in function of the evolution of the technology that interests the implementation of the present invention. Such improving measures, not described here, may eventually be the subject of further patent applications associable to this invention.

The invention claimed is:

1. A stabilized pointing system comprising a movable supporting element (210) bound with at least three coupling elements to an unstable platform, wherein
   one coupling element is a joint (211) which allows rotation only with two or three degrees of freedom, and wherein at least two other coupling elements are extensible legs whose length is controllable by an actuator element, and each of said extensible legs is bound to said movable supporting element (210) at one of its end, and to said unstable platform at the other end; and wherein said extensible legs are characterized in that:
   a. at least one said extensible legs also comprises one or more elements for damping and attenuation of the extension or compression of said extensible leg, and
   b. said one or more elements for damping and attenuation and said actuator element are placed in series in each leg, and
   c. the bonds of said at least two extensible legs with said movable supporting element (210) and with said unstable platform are joints, which allow rotation only, with at least two degrees of freedom each.

2. The stabilized pointing system according to claim 1 wherein said extensible legs are just two.

3. The stabilized pointing system according to claim 1 wherein at least one extensible leg is bound in at least one of its two ends by means of a joint which allows rotation with three degrees of freedom.

4. The stabilized pointing system according to claim 1 wherein at least one extensible leg is bound at both its two ends by means of a joint which allows rotation with just two degrees of freedom, and one part of said extensible leg is free to rotate, with respect to another part thereof, around the axis of extension.

5. The stabilized pointing system according to claim 1 wherein said one or more elements for damping and attenuation of the extension or compression of said extensible leg, are passive elements characterized by a non-controllable stiffness coefficient, and by a dissipative coefficient also non-controllable.

6. The stabilized pointing system according to claim 1, wherein said unstable platform, to which said movable supporting element (210) is bound, is a satellite platform (100).

7. The stabilized pointing system according to claim 1, wherein said unstable platform, to which said movable supporting element (210) is bound, is, in its turn, bound to a satellite platform (100) by means of a system of bonds which allows movements of rotation with at least two degrees of freedom.

* * * * *